(12) United States Patent
Woodall

(10) Patent No.: US 9,786,034 B1
(45) Date of Patent: Oct. 10, 2017

(54) LOW COST COLOR CHANNEL ADAPTIVE PROCESSES

(71) Applicant: Pixelworks, Inc., Portland, OR (US)

(72) Inventor: Neil Woodall, Newport Beach, CA (US)

(73) Assignee: Pixelworks, Inc., Portland, OR (US)

( * ) Notice: Subject to any disclaimer, the term of this patent is extended or adjusted under 35 U.S.C. 154(b) by 0 days.

(21) Appl. No.: 14/265,905

(22) Filed: Apr. 30, 2014

(51) Int. Cl.
*G06T 3/40* (2006.01)

(52) U.S. Cl.
CPC .................. *G06T 3/4007* (2013.01)

(58) Field of Classification Search
CPC ........................ H04N 19/186; G06T 3/4007
See application file for complete search history.

(56) References Cited

U.S. PATENT DOCUMENTS

| | | | | |
|---|---|---|---|---|
| 5,008,752 A | * | 4/1991 | Van Nostrand | G06T 3/4007 348/581 |
| 8,810,727 B1 | * | 8/2014 | Bernard | H04N 11/002 348/453 |
| 2008/0036792 A1 | * | 2/2008 | Liang | G06T 3/4007 345/660 |
| 2013/0051519 A1 | * | 2/2013 | Yang | G06T 11/005 378/19 |

* cited by examiner

*Primary Examiner* — Bhavesh Mehta
*Assistant Examiner* — Menatoallah Youssef
(74) *Attorney, Agent, or Firm* — Marger Johnson

(57) ABSTRACT

A method of scaling image data, includes receiving image data at a processor in at least two channels, the image data having a first resolution for the a channel and a second, lower resolution for other channels, using known pixel values of the first resolution pixels to generate an interpolation function to be applied to second resolution pixels co-located with a subset of the first resolution pixels, and applying the interpolation function to the second resolution pixels to find the unknown pixel values.

10 Claims, 3 Drawing Sheets

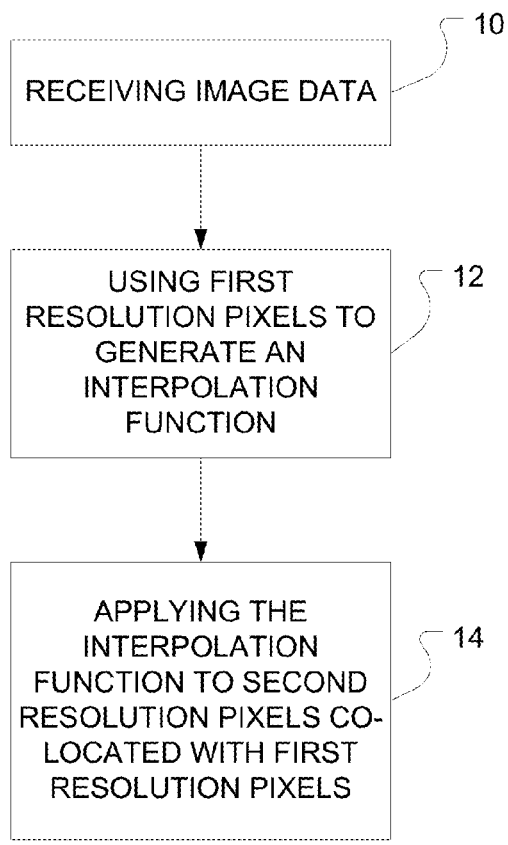

| L1 | | L3 | | L5 | | L7 |
|----|----|----|----|----|----|----|
| | | | | | | |
| L15 | | L17 | | L19 | | L21 |
| | | | K25 | | | |
| L29 | | L31 | | L33 | | L35 |
| | | | | | | |
| L43 | | L45 | | L47 | | L49 |

LOW COST COLOR CHANNEL ADAPTIVE PROCESSES

BACKGROUND

Adaptive scaling algorithms often use only one color channel of an image to save cost. Algorithms in the YUV color space typically operate on the luma (Y) channel. The processes typically interpolate chroma (UV) channels using polyphase filtering or other non-adaptive scaling algorithms. This can lead to a situation where the borders of objects in the mage can be smooth in the luma channel, but have jaggies in the chroma channel. This results in noticeable degradation of the image when the colors are highly saturated. Similar problems arise in demosaic operations of imaging sensors that use a Bayer filter, or where the ideal color space for interpolation is different than that for determining how to do the adaptation.

BRIEF DESCRIPTION OF THE DRAWINGS

FIG. 1 shows a set of pixels used in an adaptive scaling process.

FIG. 2 shows a flowchart of an embodiment of a process of guided interpolation.

DETAILED DESCRIPTION OF THE EMBODIMENTS

Figures 3, 4:
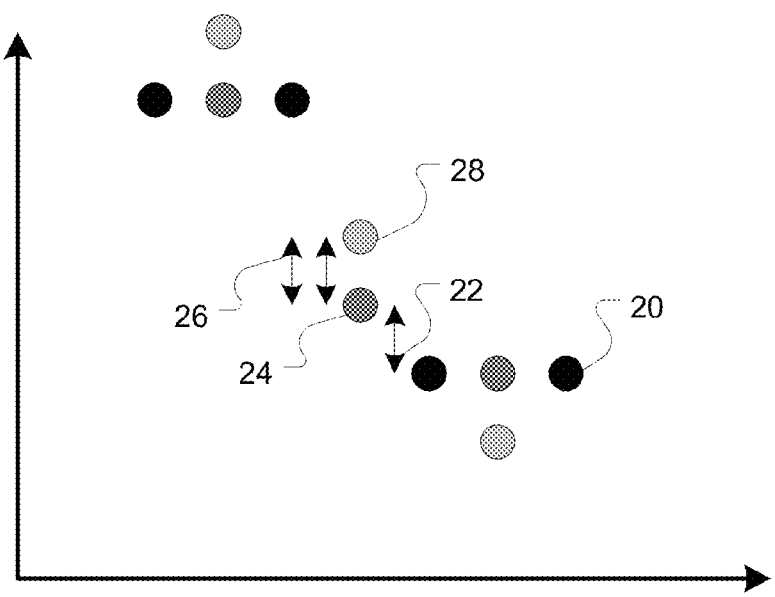
FIG. 3 shows a one-dimensional graph of interpolation results using different methods.
FIG. 4 shows an example of a set of pixels used in an adaptive scaling process.

In the following discussion, it is assumed that the video processing is being done in YUV space for simplicity in illustrating the process. No limitation should be assumed with respect to the color channel or color space (Y) used for the initial adaptive algorithm or the color channel or color space used for the related color channels or color spaces (UV). The only requirement is for edges in the color channels or spaces to be correlated with each other and that there exists a higher resolution image (Y) with co-located pixels with the lower resolution image (UV).

Instead of using non adaptive scaling, duplicating the adaptive logic for the UV channel or mimicking the results of the decision logic used to do the scaling in the Y channel, chroma scaling is done with a simple adaptive algorithm that is guided by the results of the more complex Y algorithm or the already existing higher resolution image data. While this approach may not provide the same amount of detail as an independent algorithm, it will create edges that are highly correlated with the Y result, exactly the place where the lack of detail in the chroma channel is most noticeable. Also, it can avoid making mistakes, which can occur if the decisions of the adaptive logic are blindly mimic, or when the Y edges are not correlated with the UV edges. Although the UV edges will not be as smooth, they will be closer than using the results of the Y decision logic.

FIG. 1 shows an embodiment of this process. The image data is received at a graphics processing unit, a central processing unit or a post-processor, all included in the term 'processor.' The image data is in 'color channel' format, which include Y-UV or Red-Green-Blue format, among others. One should note that there are references to a first channel upon which the more complex process is performed, and other 'channels' upon which the simpler process will be applied. The term 'channels' includes a single channel as well. Generally, the first channel will have pixels at a first resolution that is higher than the resolution of the other channels. The lower resolution channel pixels will typically have pixels co-located with some subset of the pixels of the higher resolution channel.

At 12, the pixels of the first resolution channel are adaptively scaled if they are not already of a higher resolution or do not have pixels collocated with the other channels. Then in 14, two functions are selected that best approximate a known first channel pixel that is not collocated with the other channels by using first channel pixels that are collocated with the other channel pixels. A final interpolation function is generated using the two functions that were selected in 14 such that the output of the interpolation function matches the known first channel pixel. For example, the first color channel may be the Y channel, or in the case of RGB, the green channel, as the eye is more sensitive to higher spatial frequencies in these channels than the red and blue channels. Once the interpolation function is generated, it is then applied to the lower resolution pixels.

Once the Y channel result has been obtained, regardless of the method or whether preexisting, an adaptive process is applied to the original Y pixels. But instead of trying to figure out how to create an unknown missing pixel with only the surrounding pixels, the process instead finds the best way to recreate the known pixel value, by using simple decision logic. It is possible to simplify the decision logic because the target value is now known, unlike in the case when an original adaptive algorithm that was applied to the Y channel to create a higher resolution image. Specifically, the process tries to find the two best methods for creating the known pixel value and then finds the interpolation ratio that will create a value equal to it at 16. This is first done in the Y channel where the process already knows the value of the missing pixel based on the more complex decision logic or existing data. Then the same two estimation methods are used in 18 with the UV data along with the same interpolation ratio found using the Y data to find the unknown UV pixel data.

To illustrate the process, a simple 2× upscaling case can be used. In FIG. 2, 9 pixels are shown. Four of them are original resolution pixels (A1, A3, A7 and A9) and 5 have been created through an adaptive algorithm. To illustrate the process, one can take the case for generating the pixel value at B5. In the Y channel, the process first calculates the following values:

$$D1 = A1 - B5$$

$$D3 = A3 - B5$$

$$D7 = A7 - B5$$

$$D9 = A9 - B5$$

If both negative and positive values are obtained, then the largest negative number (closest to zero) and smallest positive number are obtained. For example, D7 might be the largest negative and D9 might be the smallest positive number. Then the process can find B5 by the following calculation:

$$R = D9/(D9 - D7)$$

$$B5 = A7 \times R + A9 \times (1 - R),$$

Where R is the interpolation ratio. In this example, the blending factor is the interpolation ratio, with the understanding that other blending factors may be used, as will be discussed in more detail later.

To prove that this works:

$$B5=A7\times\{D9/(D9-D7)\}+A9\times\{1-D9/(D9-D7)\}$$

$$B5=A7\times\{(A9-B5)/(A9-A7)\}+A9\times\{1-(A9-B5)/(A9-A7)\}$$

$$B5=A7\times\{(A9-B5)/(A9-A7)\}+A9\times\{(A9-A7-A9+B5)/(A9-A7)\}$$

$$B5=A7\times\{(A9-B5)/(A9-A7)\}+A9\times\{(-A7+B5)/(A9-A7)\}$$

$$B5=(A7\times A9-A7\times B5-A9\times A7+A9\times B5)/(A9-A7)$$

$$B5=(-A7\times B5+A9\times B5)/(A9-A7)$$

$$B5=B5\times(A9-A7)/(A9-A7)$$

$$B5=B5$$

That is, once the process has found the Y value for B5 using a complex scaling algorithm, one can simplify the algorithm given that is already known to be the desired result. This method may be referred to a guided interpolation (GI). Because Y and UV values are highly correlated in natural images, the process can now estimate the B5(UV) using the same equation. That is, if $$B5(Y)=A7(Y)\times R+A9(Y)\times(1-R)=GI(AB(Y),A(Y));$$

where AB(Y) is the set of original and interpolated Y pixels and A(Y) is the subset of just original pixels. Then, $$B5(UV)=A7(UV)\times R+A9(UV)\times(1-R)=GI(AB(Y),A(UV)).$$

While the above would work with deltas that are all positive or all negative (R>1 or <0), the use of extrapolation would be considered too large of a risk for practical applications. Therefore, usually, the method that produces the closest result would be used. That is, R is constrained to be in the range [0,1].

The other missing pixels can be found in a similar manner, and may even use already interpolated pixels, such as B5, in the process.

The application of the technique is not limited to using an interpolation of the two nearest pixel values. For example, a polyphase, bi-cubic or other similar high quality upscaling algorithm is typically used as one of the methods to generate the missing pixel. This insures that for local minimums and maximums, the UV pixels are not generated using pixel replication or linear interpolation, methods that can result in increased jaggies or other undesirable artifacts.

While the above method works well when the edges of the two channels are correlated, Y and UV data is not always strongly correlated. When the UV edge is not associated with a Y edge, the above process can result in the UV estimate being unstable in the presence of random noise. That is, while the choice of which pixels or methods to use makes very little difference in the generation of the Y pixels, they may make a big difference in the UV results. Therefore, a little noise in the Y channel can lead to very large changes in the UV channel. To avoid this problem, a high quality non-adaptive scaler generates the interpolated Y and UV pixels. The delta between this result and the result obtained by super resolution or other complex adaptive scaling algorithm is used to limit the delta allowed in the UV result as shown in FIG. 3.

$$\text{Delta}\_y=K25-S(A(Y)), \text{ where } S \text{ is a non-adaptive scaling algorithm.}$$

$$\text{Delta}\_uv=GI(AB(Y),A(UV))-S(A(UV))$$

$$UV(B5)=\text{sign}(\text{Delta}\_uv)*\min(\text{abs}(\text{Delta}\_y),\text{abs}(\text{Delta}\_uv))+S(A(UV))$$

To handle shallow angles, more pixels are needed. For example, one might use a 4×4 neighborhood such as that in FIG. 3 in the process below. In this application, the process can estimate the center pixel (K25) using several different methods.

$$K25=(L15+L35)/2; \text{ or}$$

$$K25=(L17+L33)/2; \text{ or}$$

$$K25=(L19+L31)/2; \text{ or}$$

$$K25=(L21+L29)/2; \text{ or}$$

$$K25=(L3+L47)/2; \text{ or}$$

$$K25=(L5+L45)/2; \text{ or}$$

$$K25=\{25\times(L17+L19+L31+L33)-5\times(L3+L5+L15+L21+L29+35+L45+L47)+L1+L7+L43+L49\}/64.$$

The same process as described before applies. First find the two methods in the Y channel that are the best estimates for K25, but with one over and one under estimating K25. Find the ratio of the two methods that provides the correct value. Use the same methods and ratio in the UV channel to estimate the UV data.

In this case, additional constraints can be placed on the process. For example, one constraint might be to bias the results towards using the most conservative angles. For example, by requiring a smaller delta to use a less conservative angle versus the most conservative angles. The term conservative, as used here, means that the pixels used to interpolate the missing pixel are closer to each other. Another would be to be consistent in the direction of the angles. If the best estimate is a positive angle, then both estimates used to interpolate the final value should be positive.

FIG. 4 shows in 1D how the adaptively interpolated value is recreated using a simpler approach. Three estimates are available: the pixel to the left, the pixel to the right and a non-adaptively interpolated pixel (cubic) 28. In this case, the adaptively generated pixel 24 can be generated by a 50:50 blend shown as 22 and 26 of the cubic result and a nearest neighbor pixel, with the black pixels such as 24 being the original pixel.

While the discussion above shows a simple 2× upscaling, the scaling ratio does not need to be an integer ratio. The various interpolation methods can be adapted to accurately reflect the true pixel position relative to the original pixel positions. Alternatively, the ratio found can be allowed to compensate for the position shift, or some combination of the two. For example, using the simple nearest neighbor method shown in FIG. 1 combined with another estimate using a polyphase filter (or other interpolation algorithm) could be used for non-integer scaling ratios.

While the above uses a ratio as the blending factor to do the blending between interpolation functions to find the correct pixel values, other methods are also possible. For example, the most conservative of the interpolation methods could be picked as baseline value and the delta between that method and the next best method in the Y channel could be used to determine how far towards the next best method in the UV channel to adjust to blend. Note, that this works because the frequency content of the UV channel is typically much lower than the Y channel.

Figure 5:
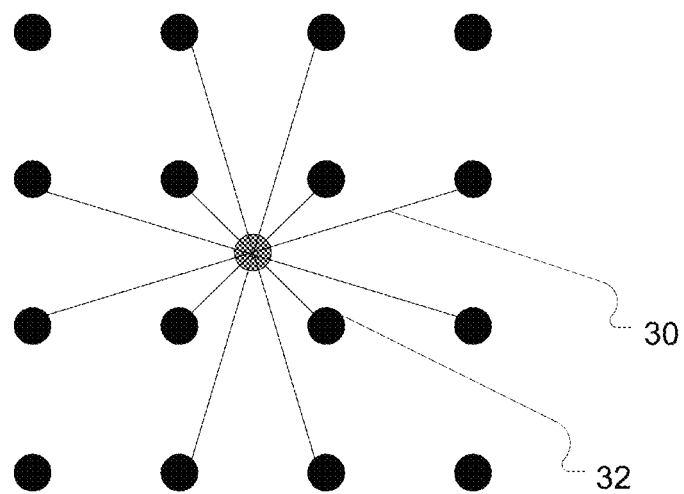
FIG. 5 shows a graphical representation of different angles of interpolation.

If the two best methods are M1 and M2, shown in FIG. 5 as 30 and 32, and 32 is the more conservative choice (the value closest to the non-adaptive scaling method. Then find the delta $$D(Y)=P(Y)-M2(Y)$$

Then in the UV channel do the following:

$$D(UV)=M1(UV)-M2(UV))$$

$$P(UV)=\text{sign}(D(UV)*\min(\text{abs}(K*D(UV)),\text{abs}(D(Y)))+M2(UV)$$

This method also has the advantage of further limiting unstable changes in the UV interpolation when the UV edge is not associated with a Y edge because the delta above would be close to zero for that case.

While the above describes a method of upscaling images where the initial resolution and spatial position for all the color channels are the same, it is possible to apply the method to other cases. For cases where the initial color channels are not co-located, the following method could be used. Upscale the higher resolution color channel such that you generate co-located pixels with the lower resolution channel. Use the simple adaptive algorithm to estimate how to generate the upscaled image pixels that are not co-located with the lower resolution channel. Apply the results of the simple adaptive algorithm to the other color channels to generate the final upscaled image result.

For example, in the demosaic case, upscaling the green channel by a factor of 1.4× in each direction will result in green pixels co-located with the blue and read channels. The upscaling of the green data may use a sophisticated edge adaptive algorithm and might include other features to minimize color fringing. The simple adaptive algorithm is then applied using the green channel pixels that are co-located with red and blue to find green channel pixels that are co-located with the opposite color. Once those pixels are found, then the algorithm is applied one more time. In this case, the non-co-located green pixels are the original data that was not co-located with the lower resolution red and blue color pixels.

One issue that may arise with regard to applying this process for demosaicing of sensor data in the RGB color space concerns a lack of interpolation values on both sides of an existing sample. An adaptation of this process would employ an offset in the higher resolution channel, in this case green, and use the same offset for other channels. In this case, if we assume that A7(G) is the closest estimate for B5(G), then we can calculate the offset as, $$\text{Goff}=B5(G)-A7(G)$$

Then we can calculate B5(RB) as, $$B5(RB)=A7(RB)+\text{Goff}$$

The use of an offset is appropriate because RGB is generally more highly correlated at high frequencies than luma and CrCb channels and using the offset method results in a lower saturation (less color fringing) for edges than not using an offset.

Another case occurs when the adaptive algorithm should use a color channel that is closer to human perception of brightness (non-linear RGB or YUV color spaces) instead of one that is proportional to the actual brightness level (linear RGB or XYZ color spaces). In this case, the complex and simple adaptive algorithms use the perceptual space and then the interpolation ratio found is used to interpolate in the linear color space. Because the linear and non-linear edges are always correlated, there is no need to limit the amount of adjustment done. All that is required is the best pixel estimates to use and the interpolation ratio.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of scaling image data, comprising:
   receiving image data at a processor in at least two channels, a first high resolution channel having the image data at a first, high resolution, and at least a second low resolution channel having image data at a lower resolution than the high resolution;
   obtaining low resolution image data for the first channel from the high resolution image data;
   for each high resolution pixel, generating at least three estimates of the high resolution pixel in the first channel from the low resolution image data for the first channel using at least three different interpolation functions;
   selecting at least a first interpolation function that produces a first estimate that is a closest estimate of estimates that have values higher than the high resolution image data and a second interpolation function that produces a second estimate that is a closest estimate of estimates that have values lower than the high resolution image data;
   selecting the first and second interpolation functions to interpolate the image data in the second low resolution channel; and
   blending outputs of the first and second interpolation functions in the second low resolution channel to produce interpolated high resolution image data.

2. The method of claim 1, further comprising generating the first high resolution data by upscaling lower resolution data.

3. The method of claim 1, wherein using first resolution pixels to generate the interpolation function comprises finding a ratio between estimates that are above and below the known value.

4. The method of claim 1, wherein generating estimates of high resolution pixels using at least three interpolation functions includes finding a pixel value offset between a closest estimate and the known value.

5. The method of claim 3, wherein using first resolution pixels to generate the interpolation function further comprising:
   applying a non-adaptive scaler to the image data to interpolate pixels in the first and other color channels;
   determining a difference between the first process in the first color channel and a result of the non-adaptive scaler; and
   using the difference as a limit to changes from the non-adaptive scaler in the other color channels.

6. The method of claim 1, wherein using first resolution pixels to generate the interpolation function comprises:
   determining differences between original neighboring pixels and the known pixel value;
   using a largest negative and a smallest positive difference as the first and second estimates;

determining the interpolation ratio by dividing the smallest positive difference by a difference between the smallest positive and the largest negative; and multiplying a pixel that resulted in the largest negative by the ratio and the pixel that resulted in the smallest positive by the complement of the ration to produce an interpolated pixel value in the other color channel.

7. The method of claim 6, wherein determining differences between original neighborhood pixels comprises using an estimate that is a function of the neighborhood pixels.

8. The method of claim 1, further comprising applying a constraint to the results of the interpolation function to limit the results to a particular range.

9. The method of claim 8, wherein applying a constraint to the results of the interpolation comprises using angles having a same sign as an angle of a best estimate, wherein the best estimate is the estimate closest to the high resolution pixel value.

10. The method of claim 1, wherein the image data has pixels in the channels that are not of same spatial positions, the method further comprising scaling the image data to generate pixels co-located with the other pixels prior to using high resolution pixels.

\* \* \* \* \*